Patented Apr. 4, 1939

2,153,286

UNITED STATES PATENT OFFICE 2,153,286

PROCESS FOR PREPARING WETTING AGENTS AND DETERGENTS

William J. Sweeney, Baton Rouge, La., assignor to Standard Oil Development Company, a corporation of Delaware No Drawing. Application December 30, 1933, Serial No. 704,749

9 Claims. (Cl. 260—460)

This invention relates to improved detergents and methods for their preparation and, more particularly, to those prepared from strong mineral acid derivatives of cracked paraffin of high molecular weight.

It has long been known to refine mineral oils with strong or fuming sulphuric acid and to obtain sulphonic acids from the treated oils and the resulting acid sludges by known methods. The sulphonates produced by neutralizing these acids with alkalies have been proposed for use as wetting agents and detergents. These sulphonates, however, have not a very high wetting or cleansing power and cannot be satisfactorily used in many cases, such as in hard water or in the presence of large amounts of mineral electrolytes.

It has now been found that a very superior class of wetting agents and detergents, suitable generally for cleansing and laundering purposes, are prepared by treating cracked paraffins of relatively high molecular weight, say of about 6 or 8 to 20 or more carbon atoms per molecule, with a strong mineral acid such as concentrated or fuming sulphuric acid, preferably at a low temperature, and neutralizing the resulting acid derivatives with a suitable base such as the alkalies. The resulting products are far superior to the ordinary mineral oil sulphonates as wetting agents and detergents and, in fact, are at least equal in cleansing and laundering characteristics to the best known detergents of any type. Other strong mineral acids, such as chlorsulfonic and phosphoric acid, may similarly be used to prepare improved detergents.

The cracked products preferred for the preparation of mineral acid derivatives, according to the present invention, are those obtained by cracking paraffin hydrocarbons containing preferably about 15 to 30 or more carbon atoms per molecule, although somewhat lighter paraffins may also be used. Suitable cracking stocks are the paraffin waxes and petrolatums of mineral origin, such as those derived from petroleum. For example, paraffin waxes having melting points above 80° F. to 110° F. and even 130° F. to 160° F. are preferred for the preparation of highly effective detergents, it being generally desirable to free the wax insofar as practicable from contained oil. Largely or essentially paraffinic petroleum oils may also be used.

The cracking operation is preferably conducted under conditions designed to prevent condensation or polymerization of the cracked products to compounds of higher molecular weight, insofar as possible and to produce mixtures of olefines of more than about eight carbon atoms in which the double bond is at or near the end of the carbon chain. It is, accordingly, preferred to conduct the cracking operation at a temperature at which cracking proceeds at a fairly rapid rate and to maintain the cracking temperature for a relatively short time, adjusting cracking temperature and time to produce the maximum yield of unsaturated hydrocarbons with a minimum or very low yield of condensation or polymerization products. This may be accomplished by passing the materials in a stream rapidly through a high temperature zone and thereafter cooling the products of reaction as quickly as possible. For example, paraffin wax or petrolatum may be suitably cracked for a short time in liquid phase at a temperature of about 650 to 750° F. or in vapor phase at a temperature of about 1000 to 1100° F. This invention is not limited to the use of these particular cracking temperatures, as higher or lower temperatures may be used with suitable adjustment of temperatures and pressures. The cracking may be conducted at elevated, atmospheric, or sub-atmospheric pressures; the latter being helpful to avoid polymerization of the cracked products. The time of cracking may suitably be adjusted to permit the formation of products containing up to 50% or more of olefines, but the use of mixtures of olefines produced under cracking conditions by which the liquid product contains about 10% to 40% olefines is preferred with relatively high molecular weight olefines of about 12 or more carbon atoms per molecule.

Another suitable cracking method is to subject the paraffin to destructive distillation so that the products of decomposition are removed as vapor, diluted with undecomposed distillate vapors, from the zone of reaction immediately upon their formation and are thereafter cooled. This destructive distillation may be conducted in a continuous manner, for example, using a series of stills of progressively higher temperatures, or in an ordinary batch process using, for example, a direct fired kettle still, which may be operated with or without reflux. High molecular weight paraffin waxes, having melting points above about 100° F. are preferred for such destructive distillation feed stocks. The vapors from the distillation zone may also be subjected to further treatment in vapor phase to increase their content of olefines. For example, they may be passed at high rates through a vapor phase cracking zone, which may also contain suitable cracking catalysts, and after a short time at a suitable reaction temperature of say 800 to 1100° F. are then quickly cooled to avoid polymerization and other secondary reactions.

The total cracked product may suitably be redistilled to secure fractions of any desired boiling range for the acid reaction. Fractions boiling between about 300 and 600° F. are generally preferred. Heavier fractions, including the residue of the redistillation, may be recracked by the same methods described above, with or without addition of fresh wax, to provide additional cracked fractions for soap preparation.

The total cracked product may be subjected to treatment with sulphuric acid for the preparation of detergents, or the cracked product may be fractionated by distillation or solvent extraction to obtain fractions of desired molecular weight range and increased olefine content prior to the acid reaction. For example, liquids having a preferential solvent action for olefines over paraffins, such as aniline, sulphur dioxide, phenol, furfural, ethyl alcohol, triethyl citrate, ethylene glycol diacetate, dimethyl sulphate, dimethyl phthalate, and the like may be used to obtain olefine concentrates. Cracked waxes also generally contain substantial amounts of wax and waxy hydrocarbons which solidify on cooling the cracked fraction to temperatures of 30 or 20 to 0° F. or lower, which are preferred for treating the cracked fractions with fuming sulphuric acid. Such waxes may be removed at least partially from the cracked fractions prior to the acid reaction by any suitable dewaxing method, such as sweating, or by cold settling, filtration, centrifugal separation or centrifugal filtration and the like, any of which processes may be conducted with or without selective solvents, diluents, and with indirect or direct cooling such as the use of autorefrigerants such as liquid hydrocarbon gases. The cold liquid fraction separated from the wax may be passed directly to the acid treatment, permitting economies in refrigeration. For example, liquid ethane, propane or butane, or mixtures of such hydrocarbons, may be mixed with the cracked wax fraction and used as an autorefrigerant in both the dewaxing and the acid treating and dilution or netralization steps, the evaporation of the light hydrocarbon serving to maintain the desired low temperature of the mixture. The acid treatment may be conducted in batch or continuous operation, in parallel and counter current processes, and in any desired combination of such treating methods, as will be understood. The hydrocarbons remaining after acid treatment may be retreated with additional, preferably stronger, acid, or they may be recycled to the cracking operation, or both. Cracked fractions of a fairly wide range of molecular weight are used for the production of superior detergents, a range of about three to six or eight carbon atoms being preferred. For example, cracked fractions in which the olefines are substantially of 8 to 16 carbon atoms, 12 to 20 carbon atoms, 10 to 14 carbon atoms, and 16 to 24 carbon atoms may be used.

The cracked product preferred for the preparation of high quality detergents should be clean and light colored or white. The products obtained by cracking clean waxes are ordinarily sufficiently clean and light colored to permit reaction with acid without any retreating or refining being necessary. Dirty waxes, and dirty, dark colored or odorous cracked products, are preferably cleaned by suitable methods either before or after the cracking operation. For example, the wax or the cracked products may be treated with an acid such as sulfuric, preferably of insufficient strength or quantity to affect materially the olefine content of the cracked products treated, with an adsorptive agent such as clay or active carbon, and/or with selective solvents to remove highly reactive resin-forming constituents, such as diolefines, asphaltic matter such as pitches and tarry constituents, or other color bodies, sulfur compounds and other impurities.

The production of mineral acid derivatives from the cracked products may be conducted under conditions at which no appreciable formation of polymerization products, tars, or pitch-like acid sludges occurs. The preferred conditions involve the use of acids of high concentration at low treating temperatures; for example, fuming sulphuric acid is preferably used at temperatures between about −20 and 70° F. A particularly advantageous method is to mix concentrated or mildly fuming sulphuric acid containing, say 10 to 20% sulphuric anhydride, with cracked wax and then to add additional sulphuric anhydride to the mixture with vigorous agitation and cooling to maintain the temperature of the mixture between about −10 and 20° F. throughout the reaction period. Cracked petrolatum may be treated by adding mildly fuming sulphuric acid, containing up to about 20% sulphuric anhydride and then adding to this mixture additional fuming acid containing about 40% to 70% sulphuric anhydride. It is generally desirable to conduct the treatment of all cracked paraffins with at least one mol of sulphuric acid per mol of olefine, to employ sufficient sulphuric anhydride to obtain substantially complete reaction at the temperature used, to remove the unreacted sulphuric anhydride from the reaction mixture and to reduce the strength of sulphuric acid below about 50% before the temperature is raised. This may be accomplished by dilution with water or by neutralization with an alkali. The use of a lesser proportion of sulphuric acid results in decreased yields of the desired sulphuric acid derivatives. The use of higher reaction temperatures results in the production of products of poorer color, in lower yields of less effective detergents and in the production of objectionable pitch-like sludges. Ordinarily no such sludge is obtained when operating in the preferred manner disclosed above.

Salts of the sulphuric acid derivatives may be readily obtained by neutralization with a suitable base, such as basic compounds of the alkali and alkaline earth metals, ammonium and also the amines, alklyamines, alkylolamines and other organic bases. The detergents obtained from clean fractions of cracked wax or petrolatum according to the preferred methods described herein are usually of suitable purity and color for immediate use. However, if dirty stocks are used, or treating or drying temperatures are permitted to run too high, discolored products may result. These may be purified by treatment with clay, active carbon, by salting out of saturated salt solutions with sodium chloride or sulphate, by treatment with peroxides, and other soap refining practices. The addition of soluble calcium salts to an aqueous solution of discolored alkali detergents also serves to precipitate the color bodies. The precipitate may be removed by settling, filtration, etc., and a light colored detergent recovered from the remaining solution by drying, solvent extraction, salting out, and like methods.

The following examples are presented to illustrate the characteristics of the detergents and their preferred method of preparation according to the herein described invention:

Example I

A fraction of cracked petrolatum distilling between 360 and 600° F. is obtained in an atmospheric pressure batch destructive distillation. 36 liters of this distillate, containing about 35% of olefines, are treated at about 12 to 20° F. with 7 kilograms of fuming sulphuric acid containing 20% sulphuric anhydride, by slow addition of acid with cooling and vigorous agitation during about three hours agitation. The acid is then neutralized by careful addition of sodium hydroxide with continued agitation and cooling to maintain the temperature below 20° F. until the sulphuric acid strength is below about 60%. On completion of neutralization, 18 liters of isopropyl alcohol are added with stirring and the mixture is allowed to stand. Three layers then form, a lower aqueous layer of mineral salts, a middle alcoholic layer containing most of the sodium salts of the sulphuric acid derivatives formed, and an upper oily layer of unreacted hydrocarbons containing some of the detergent salt. The three layers are separately withdrawn. The detergent is extracted from the upper layer with 50% aqueous isopropyl alcohol, and the extract is added to the middle layer. Sufficient ammonia is added to this solution to maintain a slight excess of ammonia throughout the following drying operation. The alcohol solution is then evaporated to dryness on a drum dryer, at a temperature of about 120° F. There are then obtained 4.5 kilograms of detergent, which consists largely of sodium salts of sulphated olefines. This detergent is of a very light amber color, and gives practically colorless aqueous solutions in concentrations suitable for washing and laundering purposes, say 0.2 to 0.5%. The detergent is a highly effective detergent and is effective in soft or hard water.

Example II

A similar fraction of cracked paraffin wax prepared as described in Example I is used to prepare a sodium detergent salt by the same procedure there used. From 22 liters of the cracked wax fraction is obtained 6.6 kilograms of detergent, using only 4.5 kilograms of fuming sulphuric acid. This detergent is superior in laundering characteristics even to that prepared from cracked petrolatum in Example I, and shows substantially better sudsing and cleaning characteristics in hard water.

Example III

To a fraction of cracked wax boiling between 400 and 500° F. containing about 40% olefines, and prepared by cracking a paraffin wax of 122° F. melting point in an atmospheric pressure batch distillation, is slowly added with agitation one-half volume of 96% strength sulphuric acid at a room temperature of about 90° F. The resulting mixture is neutralized with a 20% aqueous solution of sodium hydroxide and is mixed with three volumes of ethyl alcohol. Sodium sulphate is precipitated and is filtered out. The ethyl alcohol is removed from the filtrate by distillation. Three volumes of methyl alcohol are mixed with the residue, and on being allowed to stand a lower layer of oil separates and is separately withdrawn. The methyl alcohol is removed by distillation, leaving as residue a sodium salt of sulphuric acid derivatives of the cracked wax olefines.

Example IV

Dry detergents prepared as described in Examples I and II are mixed thoroughly with equal weights of finely powdered magnesium sulphate. These compositions are superior to the best commercially available sulphated fatty alcohol preparations and fatty acid soaps in cleaning soiled wools and silks. Comparative laundering tests on pieces of the same soiled cloth were run with these detergent compositions in hard water in minimum concentration sufficient to give suds. The results are presented in the following table:

| Detergent | Sudsing concentration gms/liter | Cleansing effectiveness |
| --- | --- | --- |
| "Green" petroleum sulphonate | 10+ | Poor. |
| Cracked petrolatum (Ex. I) | 2.9 | Very good. |
| Cracked wax (Ex. II) | 2.0 | Excellent. |

Substantially pure white cloths were obtained with both the cracked petrolatum and cracked wax detergents, although the latter, even in about 50% less concentration, gave appreciably better cleansing. Both of these detergents gave much better cleansing than was obtained with the best commercially available soap compositions such as the sodium salt of sulphated lauryl alcohol, and fatty acid soaps, which were also submitted to the same laundering test.

It will be seen from the above examples that the cracked paraffin detergents are particularly effective detergents and wetting agents, and may be used generally for laundering, cleansing, wetting, penetrating, emulsifying, and like purposes. These detergents are free from carboxyl groups and, accordingly, are particularly advantageous for use in hard water and in the presence of large amounts of mineral electrolytes. In fact, the cleansing properties of these detergents, particularly those prepared from olefines of 6 or 8 to about 14 carbon atoms per molecule, are improved substantially by the addition thereto of large amounts of water soluble compounds of metals capable of forming water soluble or readily water dispersible compounds with the sulphuric acid derivatives of the detergents.

While it is preferred to prepare a mixture of the metal compound with the cracked paraffin detergents prior to use, similar advantages may also be obtained by the separate addition of this compound and the detergent to the laundering solutions or by the use of the metal constituents of such compounds in the preparation of the detergents to neutralize the sulphuric acid derivatives of the cracked paraffins. For example, the sulphuric derivatives of the cracked paraffin, prepared as described in Example I, may be neutralized with magnesium hydroxide or other alkaline compound of magnesium. Other suitable salts for use in place of magnesium sulphate, as described above, are the sulphates, bisulphates, carbonates, phosphates, such as disodium phosphate, chlorates, tartrates, and benzoates of alkali, alkaline earth, and earth metals, generally such as calcium, strontium, barium, aluminum, boron, zinc, cadmium, mercury, tin, and other metals capable of forming water soluble or water dispersible compounds of the sulphuric acid derivatives. The polyvalent metals are generally preferred for this use. Compounds having adverse physiological effects should obviously not be used in preparing detergents to be used for contacting with living organisms.

These detergents of sulphuric acid derivatives of cracked paraffin may also be used in admixture with other wetting agents and detergents, such as the ordinary petroleum acid sludge sulphonates, the sulphates of fatty alcohols, hydroxy acids and the like, fatty acid soaps, alkalies such as washing soda and ammonia, fillers, abrasives, dyes, perfumes, organic solvents and other addition products in the preparation of wetting and cleansing compositions, laundry and toilet preparations, soap powders, liquid soaps, dry cleaner soaps, and like compositions.

The presence of a slight excess of an alkali during the drying operation, as shown in Example I, is claimed in copending application Serial No. 704,790, filed December 30, 1933, by Hans G. Vesterdal. This serves to neutralize any free acids present or formed during drying, and results in a better yield of a detergent of a substantially lighter color. Other alkalies, such as sodium carbonate or bicarbonate, may be used in place of ammonia, but the latter is preferred in order to obtain a neutral detergent as the final product. The drying operation may also be conducted at lower temperatures, and under vacuum.

This invention is not to be limited to any theoretical explanation of the nature of the improved products whose preparation is described herein, nor to any examples which have been presented herein solely for the purpose of illustration, but only by the following claims in which it is desired to claim all novelty insofar as the prior art permits.

I claim:

1. Process for preparing improved wetting agents and detergents comprising cracking a paraffin wax to form a mixture of olefins having more than 6 carbon atoms per molecule, reacting the said mixture of olefins with a strong polybasic mineral acid of the group consisting of concentrated and fuming sulfuric acids, chlorsulfonic acid, and phosphoric acid, and neutralizing the resulting mixture of alkyl acid derivatives of said acid.

2. Process for preparing improved wetting agents and detergents, comprising cracking a paraffin wax to form a mixture of olefins having more than 6 carbon atoms per molecule, reacting the said mixture of olefins with fuming sulfuric acid at a temperature between $-20$ and $70°$ F. and neutralizing the resulting alkyl sulfuric acid derivatives.

3. Process for preparing improved wetting agents and detergents, comprising cracking a paraffinic petroleum fraction selected from the group consisting of petrolatum and paraffin wax at a rapid rate by subjecting said fraction to a cracking temperature for a relatively short time and thereafter cooling quickly, to provide a mixture of olefins of between 6 and 24 carbon atoms per molecule, reacting the said mixture with a strong sulfuric acid at a temperature below $30°$ F., and neutralizing the resulting mixture of alkyl acid derivatives to form the said detergent.

4. Process according to claim 3 in which the said mixture of olefins has between 8 and 16 carbon atoms per molecule.

5. Process for preparing improved wetting agents and detergents comprising cracking a paraffinc petroleum fraction selected from the group consisting of petrolatum and paraffinic wax to provide a cracked fraction containing a mixture of olefins of more than 8 carbon atoms per molecule, treating the said cracked fraction with a strong sulfuric acid at a temperature below $20°$ F. and neutralizing the resulting mixture of sulfuric acid derivatives of the said olefins with an alkali.

6. Process according to claim 5 in which the said strong sulfuric acid is fuming acid.

7. Process according to claim 5 in which the said strong sulfuric acid is fuming acid containing about 20% sulfuric anhydride.

8. Process for preparing wetting agents and detergents comprising cracking a paraffinic petroleum fraction selected from the group consisting of petrolatum and paraffin wax to provide a cracked fraction containing a mixture of olefines having more than 6 carbon atoms per molecule, reacting the said mixture of olefines with a strong inorganic polybasic acid, and neutralizing the resulting mixture of alkyl acid derivatives of said acid.

9. Process for preparing wetting agents and detergents comprising cracking a paraffinic petroleum fraction selected from the group consisting of petrolatum and paraffin wax to provide a cracked fraction containing a mixture of olefines having more than 6 carbon atoms per molecule, reacting said mixture of olefines with sulphuric acid, and neutralizing the resulting mixture of alkyl acid derivatives of said acid.

WILLIAM J. SWEENEY.